United States Patent
Husted et al.

(10) Patent No.: US 8,107,427 B1
(45) Date of Patent: Jan. 31, 2012

(54) WIRELESS COMMUNICATION SHARING IN A COMMON COMMUNICATION MEDIUM

(75) Inventors: Paul J. Husted, San Jose, CA (US); Soner Ozgur, Santa Clara, CA (US)

(73) Assignee: Qualcomm Atheros, Inc., San Jose, CA (US)

(*) Notice: Subject to any disclaimer, the term of this patent is extended or adjusted under 35 U.S.C. 154(b) by 743 days.

(21) Appl. No.: 12/193,300

(22) Filed: Aug. 18, 2008

(51) Int. Cl.
*H04W 4/00* (2009.01)

(52) U.S. Cl. ........ 370/329; 370/338; 455/41.2; 455/450

(58) Field of Classification Search .......... 370/329, 370/330, 338; 455/41.2, 41.3, 450, 452.1, 455/552.1, 553.1, 556.1
See application file for complete search history.

(56) References Cited

U.S. PATENT DOCUMENTS

| | | | |
|---|---|---|---|
| 6,731,939 B1 | 5/2004 | Watanabe | |
| 6,941,110 B2 | 9/2005 | Kloper et al. | |
| 7,039,358 B1 | 5/2006 | Shellhammer et al. | |
| 7,299,009 B2 | 11/2007 | Hussmann | |
| 7,313,123 B2 | 12/2007 | Haartsen | |
| 2005/0215197 A1* | 9/2005 | Chen et al. | 455/41.2 |
| 2006/0292986 A1* | 12/2006 | Bitran et al. | 455/41.2 |
| 2007/0036170 A1* | 2/2007 | Gonikberg et al. | 370/431 |
| 2007/0274273 A1* | 11/2007 | Grushkevich et al. | 370/338 |
| 2008/0026695 A1* | 1/2008 | Choi et al. | 455/41.3 |
| 2008/0238807 A1* | 10/2008 | Ibrahim et al. | 343/876 |
| 2008/0279138 A1* | 11/2008 | Gonikberg et al. | 370/328 |
| 2009/0081962 A1* | 3/2009 | Sohrabi | 455/79 |
| 2009/0129367 A1* | 5/2009 | Bitran | 370/350 |
| 2009/0258607 A1* | 10/2009 | Beninghaus et al. | 455/77 |
| 2010/0008338 A1* | 1/2010 | Tsfati et al. | 370/338 |
| 2010/0029325 A1* | 2/2010 | Wang et al. | 455/553.1 |
| 2010/0322222 A1* | 12/2010 | Desai | 370/338 |

OTHER PUBLICATIONS

"BCM4325 Product Brief"; Broadcom; retrieved from Internet: http://broadcom.com/collateral/pb/4325-PB00-R.pdf; 2007; 2 pages.
U. S. Appl. No. 12/236,604, entitled "Message-Based Coexistence Interface Between Wireless Devices", by Cho, et al., filed Sep. 24, 2008.

\* cited by examiner

*Primary Examiner* — Jung Park
(74) *Attorney, Agent, or Firm* — Meyertons Hood Kivlin Kowert & Goetzel, P.C.; Jeffrey C. Hood; Joel L. Stevens

(57) ABSTRACT

Performing wireless communication using first and second wireless communication protocols. The first and second wireless communication protocols may operate in a common communication medium. The wireless communication may be performed using the protocols over the common communication medium, e.g., in a time sharing fashion. Properties of voice traffic on current frames of the second wireless communication protocol may be measured. The method may further include predicting whether one or more subsequent frames of the second wireless communication protocol will have voice traffic. If the prediction indicates that the one or more subsequent frames of the second wireless communication protocol will not have voice traffic data may be transmitted using the first wireless communication protocol on the common communication medium during a subsequent second wireless communication protocol time slot.

19 Claims, 7 Drawing Sheets

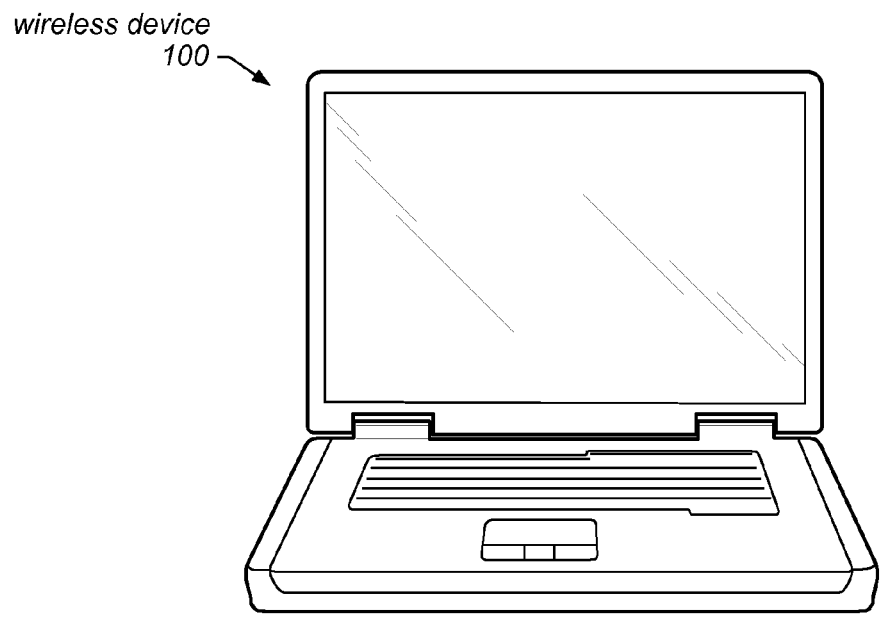
FIG. 1A
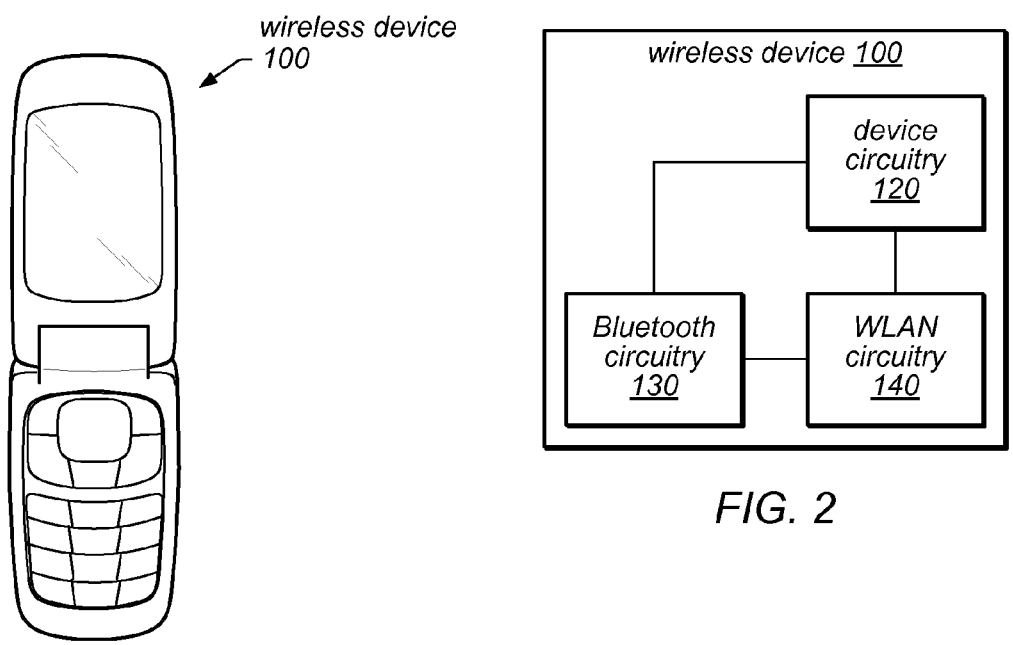
FIG. 1B
FIG. 2

WIRELESS COMMUNICATION SHARING IN A COMMON COMMUNICATION MEDIUM

FIELD OF THE INVENTION

The present invention relates generally to wireless communication, and more particularly to a method for sharing a common communication medium using two wireless protocols.

DESCRIPTION OF THE RELATED ART

Wireless communication is being used for a plethora of applications, such as in laptops, cell phones, and other wireless communication devices ("wireless devices"). In fact, wireless communication is becoming so widely used, it is common for wireless devices to be able to communicate using different wireless communication protocols simultaneously (e.g., while being in communication with a plurality of devices using the different wireless communication protocols). Additionally, wireless devices (or individual circuitry) may also compete with other wireless devices in a particular wireless spectrum. In either case above, the wireless device may need to coordinate how to share a common communication medium (e.g., a band of the wireless communication spectrum). As one example, the wireless device may coordinate time sharing of the common communication medium when using more than one communication protocol.

Some time sharing methods include use of priority signals transmitted between circuitry or devices. For example, when sharing a common communication medium between a wireless local area network (WLAN) communication protocol (e.g., 802.11a, 802.11b, 802.11g, 802.11n, 802.11x) and a short range wireless communication protocol (e.g., Bluetooth), certain signals may be transmitted between the WLAN circuitry and the short range wireless circuitry to indicate whether and how to perform sharing of the common communication medium. One approach (following the Bluetooth example above) uses signals such as "BT_ACTIVE", which may denote that the Bluetooth radio is active, "BT_PRIORITY", which may denote that the Bluetooth radio is transmitting or receiving high priority traffic, such as voice traffic, and "WLAN_ACTIVE", which may indicate that the WLAN circuitry is actively transmitting or receiving. In such scenarios, the WLAN active signal is usually dominant over Bluetooth transmission so as to ensure efficient WLAN transmission. Upon receiving the BT_ACTIVE signal, the Bluetooth radio and WLAN circuitry may time share the common communication medium using 1.25 ms on (for the Bluetooth radio) and 2.5 ms off (for use by the WLAN circuitry).

However, time sharing can lead to inefficient transmissions by the WLAN circuitry. Accordingly, improvements in sharing a common wireless communication medium between a plurality of wireless communication protocols is desired.

SUMMARY OF THE INVENTION

Various embodiments are presented of a system and method for performing wireless communication using first and second wireless communication protocols.

In some embodiments, the first and second wireless communication protocols may operate in a common communication medium. The first wireless communication protocol may be a wireless local area network (WLAN) protocol, and/or the second wireless communication protocol may be a short range wireless communication protocol (e.g., Bluetooth). Wireless communication using the second communication protocol may be performed with a headset device. For example, the wireless communication using the second communication protocol may be a device communicating with a Bluetooth headset device over a Bluetooth protocol.

Accordingly, the method may include performing wireless communication using the first wireless communication protocol and the second wireless communication protocol using the common communication medium in a time sharing fashion. Thus, frames may be transmitted using the first wireless communication protocol and the second wireless communication protocol during respective time slots. Note that the time sharing may be invoked in response to a priority signal. For example, a second wireless communication protocol priority signal may be generated to indicate that a high-priority transmission or reception using the second wireless communication protocol is being performed on the common communication medium.

Properties of voice traffic may be measured on current frames of the second wireless communication protocol. For example, measuring may include determining an average magnitude of an audio signal in the current frames and a number of zero crossings in each frame. The measuring may be performed on the receive and transmit audio data separately.

The method may include predicting whether one or more subsequent frames of the second wireless communication protocol will have voice traffic. The prediction may compare the average magnitude and/or the number of zero crossings to respective thresholds in order to make the prediction.

If the prediction indicates that the one or more subsequent frames of the second wireless communication protocol will have voice traffic, data may be transmitted using the second wireless communication protocol during a subsequent second wireless communication protocol time slot.

However, if the prediction indicates that the one or more subsequent frames of the second wireless communication protocol will not have voice traffic, data may be transmitted using the first wireless communication protocol on the common communication medium during the subsequent second wireless communication protocol time slot. Note that transmission using the first wireless communication protocol on the common communication medium during the subsequent second wireless communication protocol time slot may be performed despite the second wireless communication protocol priority signal generated above.

BRIEF DESCRIPTION OF THE DRAWINGS

A better understanding of the present invention can be obtained when the following detailed description of the preferred embodiment is considered in conjunction with the following drawings, in which:

FIGS. 1A and 1B illustrates exemplary wireless devices, according to one embodiment;

FIG. 2 is an exemplary block diagram of the wireless devices of FIGS. 1A and 1B, according to one embodiment;

Figure 3:
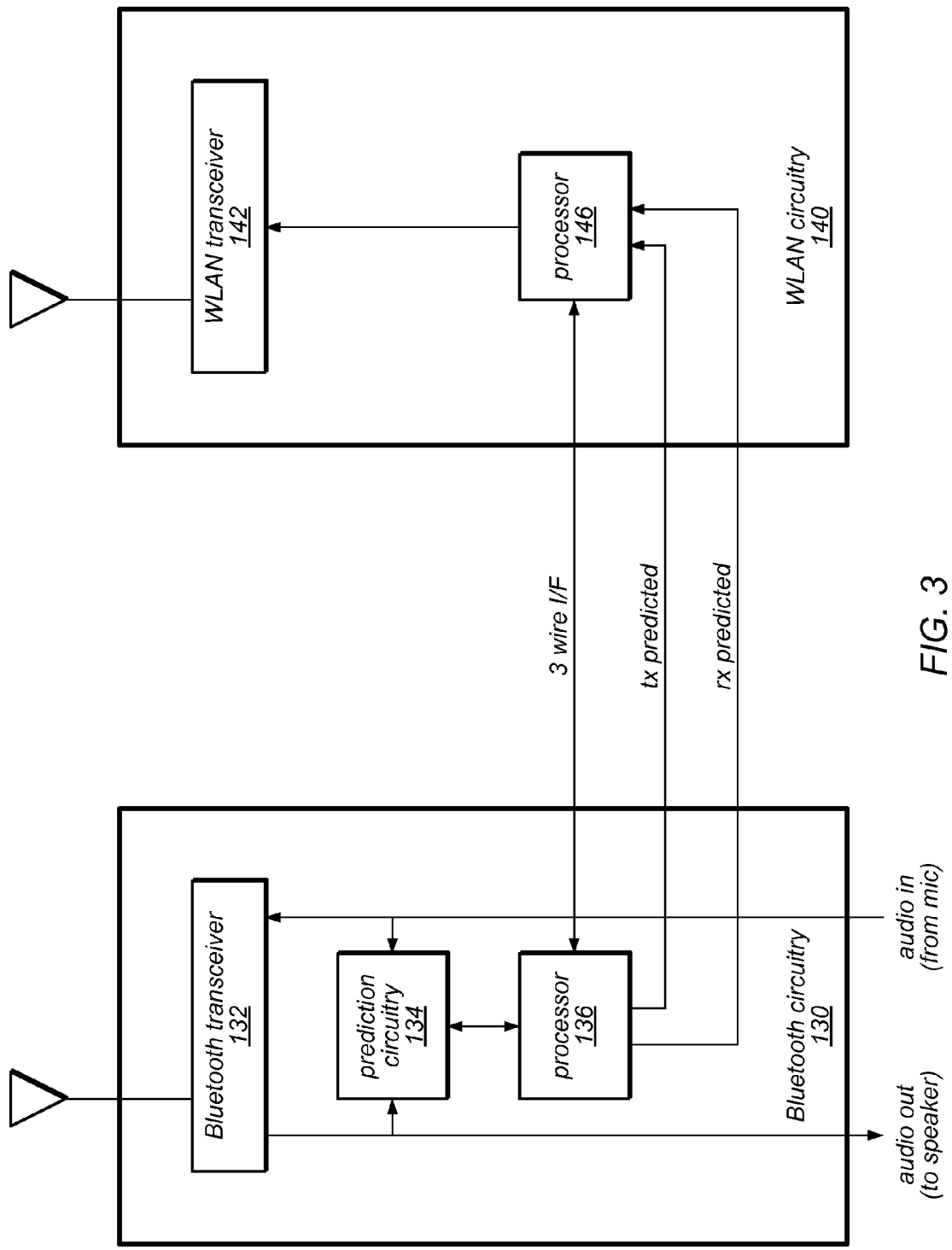
FIG. 3 is an exemplary circuit diagram illustrating Bluetooth circuitry and WLAN circuitry of the exemplary wireless devices, according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

FIGS. 1A and 1B—Exemplary Wireless Devices

FIGS. 1A and 1B illustrate an exemplary wireless device 100, according to one embodiment. As shown in FIG. 1A, the wireless device 100 may be a laptop or mobile computing device. Alternatively, as shown in FIG. 1B, the wireless device 100 may be a cell phone or smart phone or other similar mobile device. However, it should be noted that other wireless devices are envisioned, such as personal digital assistants, multimedia players (portable or stationary), routers, and/or other mobile devices/computing systems which are operable to use wireless communication.

The wireless device 100 may be configured to perform wireless communication using a first wireless protocol and a second wireless protocol. In some embodiments, the first wireless protocol may be a WLAN protocol. Additionally, the second wireless protocol may be a short range wireless communication protocol, such as Bluetooth. As used herein, a short range wireless protocol may refer to wireless protocols which support distances of up to 1 meter to 10 meters, or in higher powered devices, 100 meters. For the remainder of the description, any references to the Bluetooth protocol, Bluetooth circuitry, etc. is meant to include and encompass any short range wireless communication protocol or associated circuitry. However, it should be noted that the method may be performed for two long range wireless communication protocols or two short range communication protocols, more than two protocols, and/or any combination thereof.

The first and second wireless communication protocols may overlap in spectrum, e.g., 2.4 GHz. In other words, the first and second wireless communication protocols may share a common communication medium. Note that references to the "common communication medium" may refer to portions of a spectrum. More specifically, a common communication medium may refer to the 2.4 GHz spectrum in the case of Bluetooth and 802.11x. However, there may not be a common communication medium for protocols which utilize non-overlapping portions of the spectrum.

FIG. 2—Exemplary Block Diagram of the Wireless Device

As shown in FIG. 2, the wireless device 100 may include device circuitry 120 (for performing various functions of the wireless device), Bluetooth circuitry 130, and WLAN circuitry 140. The Bluetooth circuitry 130 and the WLAN circuitry 140 are described in more detail regarding FIG. 3 below. However, it should be noted that one or more of the Bluetooth circuitry 130 and the WLAN circuitry 140 may be located in separate devices and/or may be coupled in a wired or wireless fashion. However, in preferred embodiments, the WLAN circuitry 140 and the Bluetooth 130 circuitry may be co-located.

Additionally, the wireless device 100 may include one or more wireless or wired ports for communicating over a network. The wireless device 100 (e.g., the device circuitry 120) may further include one or more memory mediums and processors for implementing various functionality. Additionally, the wireless device 100 may include a wireless transceiver, such as the wireless transceiver described herein. Thus, the wireless device 100 may be operable to perform various methods described herein (e.g., using the Bluetooth circuitry 130 and WLAN circuitry 140 included in the wireless device 100).

FIG. 3—Exemplary System Diagram of the Bluetooth and WLAN Circuitry

As shown, FIG. 3 is an exemplary system diagram of the wireless device 100, showing the Bluetooth circuitry 130 and WLAN circuitry 140. Note that various components may be added, removed, or configured in different manners, as desired.

More specifically, as shown, the Bluetooth circuitry 130 may include a Bluetooth transceiver 132 which may be coupled to a Bluetooth antenna as well as audio input and output ports (e.g., to a speaker and from a microphone). Additionally, the Bluetooth circuitry 130 may include prediction circuitry 134, e.g., for predicting whether or not subsequent frames or packets of data will contain voice audio, and a processor 134. However, it should be noted that in some embodiments, the prediction circuitry 134 may be located outside of the Bluetooth circuitry 130, as desired. The processor may be any of various processors, e.g., central processing units, such as those provided by Intel or Advanced Micro Systems, various mobile processing units, low power processing units, etc. The processor 136 may be coupled to a memory medium (not shown) which stores program instructions executable by the processor to perform various methods and functions described herein.

As shown, the Bluetooth circuitry 130 may be coupled to the WLAN 140 circuitry via various lines. In the exemplary diagram shown, the Bluetooth circuitry 130 and the WLAN circuitry 140 may be connected via 5 lines or wires, e.g., using a typically 3 wire interface (typically used to connected WLAN and Bluetooth circuitry in devices) as well as two additional lines (tx predicted and rx predicted for providing prediction information to the WLAN circuitry 140). However, it should be noted that this interface is exemplary only and other interfaces are envisioned (e.g., including additional wires for other purposes). For example, a customized set of wires may be used (as opposed to the typical 3 wire I/F with additional wires) which may be particularly designed for the wireless communication sharing described herein. In one embodiment, a 4 wire interface may be used, where the additional wire may indicate a WLAN priority signal (i.e., that the next WLAN transmission is high priority). Additional wire configurations are envisioned.

As also shown, the WLAN circuitry 140 may include a WLAN transceiver 142 coupled to an antenna as well as processor 146. Similar to above, the processor 146 may be any of various processors and may be coupled to a memory medium storing program instructions for performing various functionality or methods described herein.

Figure 4:
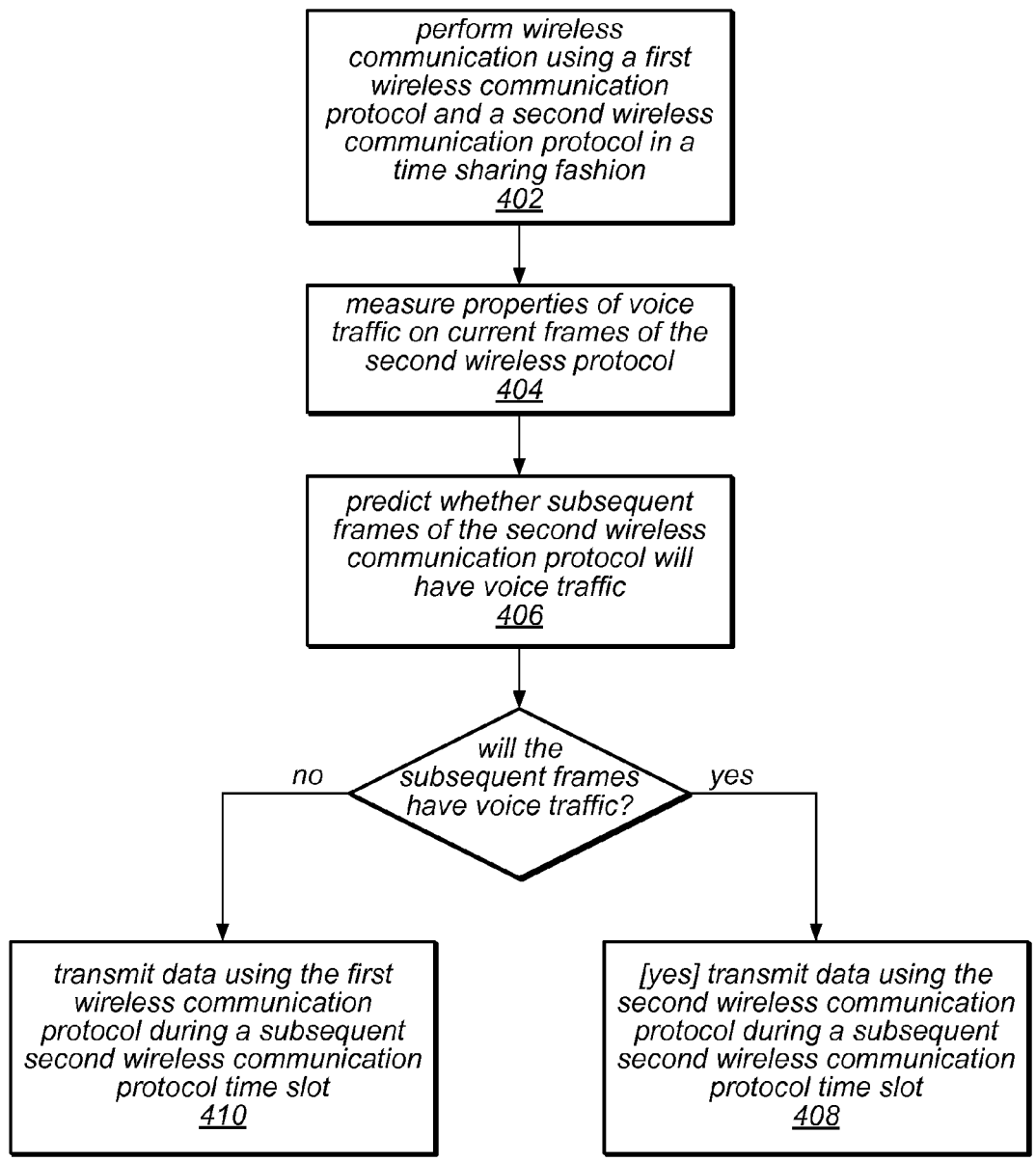
FIGS. 4-7 are flowchart diagrams illustrating embodiments of a method for sharing a common communication medium using two wireless protocols, according to one embodiment.

FIG. 4-Method for Sharing a Common Communication Medium

FIG. 4 is a block diagram illustrating one embodiment of a method for performing wireless communication using a plurality of communication protocols over a common communication medium. The method shown in FIG. 4 may be used in conjunction with any of the computer systems, devices, or circuits shown in the above Figures, among other devices. In various embodiments, some of the method elements shown may be performed concurrently, performed in a different order than shown, or omitted. Additional method elements may also be performed as desired. As shown, this method may operate as follows.

In 402, wireless communication may be performed using a first wireless communication protocol and a second wireless communication protocol using the common communication medium. The wireless communication may be time shared between the first protocol and the second protocol. For example, frames or packets of data may be transmitted during respective time slots for the first and second communication protocols. As a specific example, the first communication protocol may be used for 2.5 ms and then the second communication protocol may be used for 1.25 ms in an iterative fashion. As used herein "time sharing" of the communication protocols is used to indicate that each protocol may be used during respective time periods. In the example above, the first communication protocol may use its respective protocol for the first 2.5 seconds of every 3.65 seconds. Note that time sharing of different protocols does not mean that the first protocol and/or the second protocol are necessarily time based (e.g., TDMA), but that this time sharing may be applied to non-time based protocols (e.g., CSMA).

However, the above described 2.5 ms and 1.25 ms time sharing is exemplary only and other patterns or time periods are envisioned. For example, different ms periods are envisioned other than 2.5 ms and 1.25 ms (e.g., 2.5 ms and 2.5 ms, among various other possibilities). Thus, the time sharing may be symmetric (where both protocols may be used for equivalent periods of time) or asymmetric (such as in the example above, where one protocol may be used for a longer amount of time than the other protocol). Additionally, patterns other than strict alternation are envisioned.

As indicated above, the first communication protocol may be a WLAN protocol, e.g., an 802.11x protocol. Exemplary 802.11 protocols include 802.11a, 802.11b, 802.11g, and 802.11n. As also indicated above, the second communication protocol may be a short range wireless communication protocol, e.g., for creating an ad-hoc network, such as Bluetooth. In some embodiments, the method may be performed by a cell phone (among various other wireless devices), and the cell phone may communicate via Bluetooth with a Bluetooth device, such as a headset. At the same time, the cell phone may communicate with a wireless router or other wireless device via the WLAN protocol, e.g., for browsing the Internet, retrieving files, performing voice over IP (VoIP), and/or other data communications.

In some embodiments, the wireless communication may be time shared between the two protocols (e.g., between circuitry performing the communication using the respective protocols) in response to generation or transmission of a second wireless communication priority signal. For example, the second wireless communication priority signal may be a signal that indicates that data is being or needs to be transmitted using the second wireless communication protocol. This signal may indicate to first wireless communication circuitry that the common communication medium needs to be time shared. In embodiments where the second communication protocol is a Bluetooth protocol, the priority signal may be "BT_PRIORITY", which may denote that the Bluetooth radio is transmitting high priority traffic (e.g., voice traffic) and/or "BT_ACTIVE", which may denote that the Bluetooth radio is actively transmitting. Note that these priority signals are not exclusive and that other priority signals are possible. For example, where the first communication protocol is a WLAN protocol, a first communication protocol priority signal may be "WLAN_ACTIVE", which may indicate that the WLAN circuitry is actively transmitting or receiving. Note that the WLAN transmission may dominate the Bluetooth transmission in such cases. Further note that the above example of Bluetooth and WLAN (and the corresponding priority signals) are exemplary only and that other protocols and signals are envisioned.

In 404, properties of voice traffic on current frames of the second wireless protocol (e.g., the Bluetooth protocol) may be measured. More specifically, in one embodiment, the average power of the audio signal and/or the number of zero crossing in each frame (e.g., where each frame is 30 samples at 8 KHz for an HV3 SCO (synchronous connection-oriented) connection). Note that the average energy or amplitude measurement may be effective for detecting voiced sounds of voice data. Zero crossing measurements may be effective for detecting fricatives of voice data. In some embodiments, these properties may be measured for one or both of the reception and transmission pathway current frames (e.g., to determine whether or not there is silence on either or both of the ends of a conversation). However, it should be noted that other voice activity detection (VAD) methods are envisioned.

In 406, the method may include predicting whether one or more subsequent frames of the second wireless communication protocol will have voice traffic. Following the embodiment above, if the value of the average magnitude of the audio signal and/or the number of zero crossings represent silence, then prediction information or a prediction indication of silence may be produced. Alternatively, if the values indicate that voice data will be present, the prediction information or a prediction indication of voice data may be produced. In one embodiment, this determination may be performed by comparing the values to respective thresholds (e.g., an audio signal magnitude threshold and/or a number of zero crossing threshold). In some embodiments, these thresholds may be adaptive thresholds which change over time (e.g., throughout a conversation). This may allow the threshold to adapt to changes in background noise, environmental noise or signal interference, etc. and provide an accurate prediction of silence.

However, it should be noted that in some embodiments, the transmission frames may be measured rather than predicted. For example, data from a microphone (or other recording device) may be measured to determine if a voice signal is being received or not. Thus, if a voice signal is received, then it can be determined whether subsequent transmission frames will have voice traffic. In some embodiments, this determined information may be incorporated with the prediction information as a VAD signal.

This prediction information/VAD indication may be provided to circuitry corresponding to the first communication protocol (e.g., the WLAN circuitry), e.g., over wires in addition to the typical 3 wire I/F interface. In some embodiments, the prediction information may be a simple binary value (e.g., silence or voice data); however, further embodiments are envisioned where the prediction information may provide multiple levels of confidence about the silence of the audio, possibly using multiple thresholds to accomplish this.

In 408, if it is predicted that the subsequent frames will have voice traffic, data may be transmitted using the second wireless communication protocol during a subsequent second wireless communication protocol time slot. In some embodiments, this may be performed in response to prediction information or the prediction indication of voice data; however, since this is normal operation of time sharing, this may be performed by default.

In 410, if it is predicted or determined that the subsequent frames will not have voice traffic, data may be transmitted using the first wireless communication protocol during the subsequent second wireless communication protocol time slot. However, it should be noted that this may only be performed if data necessarily needs to be transmitted during the subsequent second wireless communication protocol time slot using the first wireless communication protocol. In other words, if there will likely not be any voice traffic, the option is available for data to be transmitted using the first communication protocol. For example, if a set of frames or packets needs to be sent via the first communication protocol that exceeds the allotted time sharing time slot for the first communication protocol, the data may be sent during the second communication protocol time slot when there is no predicted voice traffic. In some embodiments, this may be performed in response to prediction information or a prediction indication (or a determination as described above) that the frames may be silent, e.g., provided by circuitry corresponding to the second communication protocol, or prediction circuitry or processing external to the second communication protocol circuitry, as desired.

In some embodiments, prediction information or determinations may be provided for transmissions and receptions independently. For example, the information may indicate that the second protocol may be used for transmission or not reception (or vice versa). Accordingly, it may be possible to use both communication protocols at the same time during the subsequent frames, e.g., based on the nature of the protocols, the nature of the predicted reception or transmission data, etc. As one example, if subsequent frames were likely to have second protocol reception traffic but no transmission, the first protocol may be used for reception, but not transmission (or whichever is appropriate). In some cases, reception may be able to be performed for both protocols at the same time, but not reception and transmission at the same time. Thus, it may be possible to perform concurrent transmissions and/or receptions based on the indication information from above.

Furthermore, where the prediction information above indicates multiple levels of confidence about silence, circuitry corresponding to the first communication protocol may use thresholds to determine when to transmit during the subsequent second communication protocol time slot. These thresholds may be adaptively changed or may be dynamic in nature, e.g., depending on the need to transmit data using the first communication protocol.

Note that this transmission during the second communication protocol time slot may be performed despite the priority signal described above (e.g., BT_PRIORITY). Thus, the Bluetooth circuitry may first indicate that it is transmitting or receiving speech data by sending the priority signal, and then at a later point (e.g., in a telephone call conversation) where neither party is speaking, the Bluetooth circuitry may send prediction information indicating that the subsequent frames will likely not be used by the Bluetooth circuitry or may be transmitted over without noticeable or very much interference. Accordingly, the WLAN circuitry may use this time slot despite the BT_PRIORITY signal. Thus, the WLAN circuitry may be able to transmit data longer than its normal time slot length (e.g., 2.5 ms) in this period. Note that the above method may be performed in an iterative or periodic fashion (e.g., each time slot for the second transmission, based on time periods (e.g., every 3.65 ms), numbers of frames, etc.). Note that the above method may be performed based on various conditions, e.g., at times when the first protocol needs additional time, according to priority signals of the second protocol, etc.

FIGS. 5A, 5B, 6, and 7—Exemplary Flowcharts

FIGS. 5A, 5B, 6, and 7 are flowcharts corresponding to specific implementations of the methods described above. These are provided as examples only, and are not intended to affect the scope of the descriptions above.

Figure 5A:
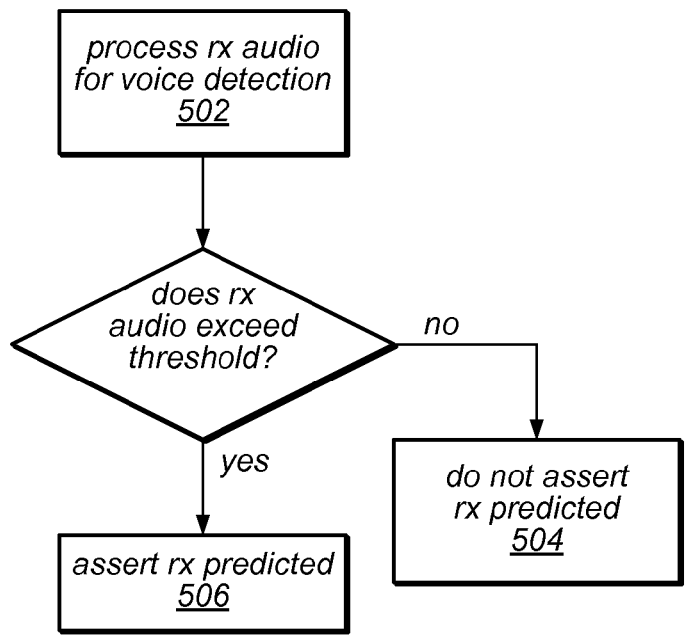
Figure 5B:
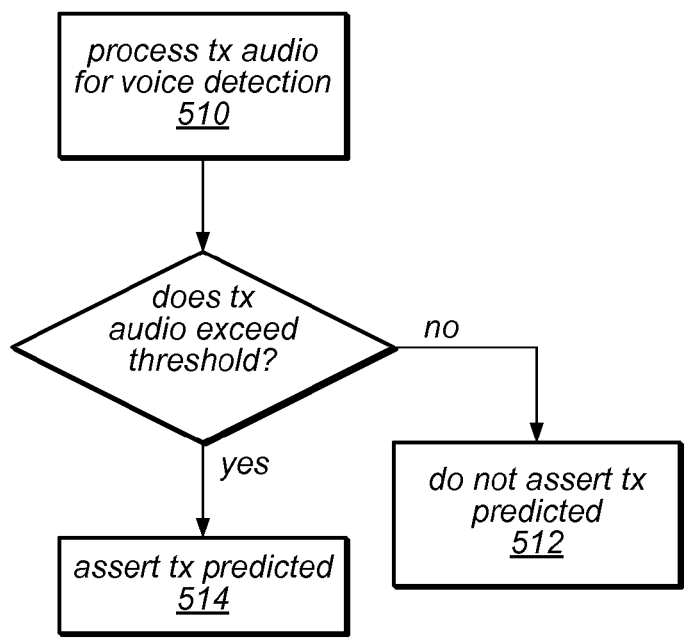

As shown in FIG. 5A, in 502, receive audio may be processed for voice detection. If the receive audio exceeds a threshold (e.g., a magnitude or zero crossing threshold) an assertion of predicted voice data is produced in 508. However, if it does not exceed the threshold the assertion is not produced in 504. Similarly, in FIG. 5B, the same processing and decisions are made for the transmit audio data is performed in 510, 512, and 514. Note that this process may be performed in an iterative and/or periodic fashion for each (or various ones of) possible WLAN transmission.

Figure 6:
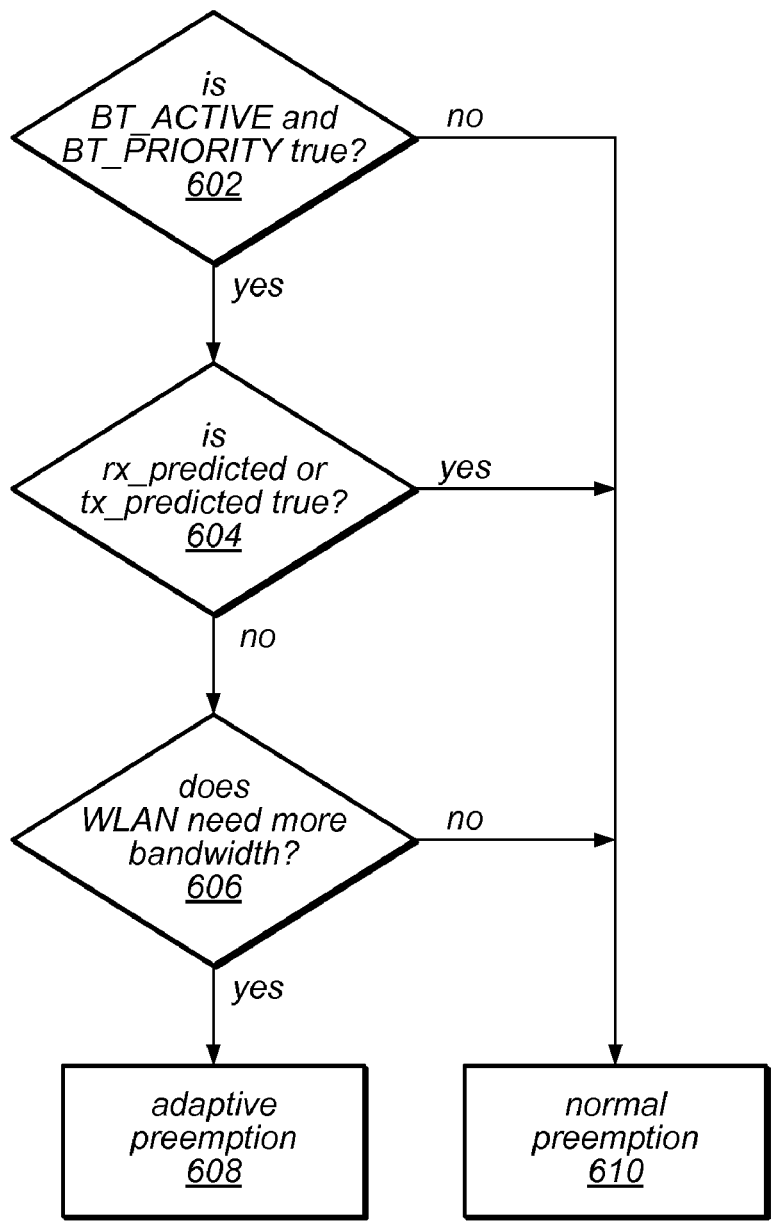

As shown in FIG. 6, if BT_ACTIVE and BT_PRIORITY are true in 602, if rx_predicted or tx_predicted (e.g., from FIGS. 5A and 5B) is false, and if the WLAN circuitry needs more bandwidth, adaptive preemption may occur in 608 (i.e., WLAN data may be transmitted over a time slot reserved for Bluetooth). However, if none of these conditions are true, normal preemption may occur in 610 (i.e., Bluetooth data may be normally sent or received, as necessary).

Figure 7:
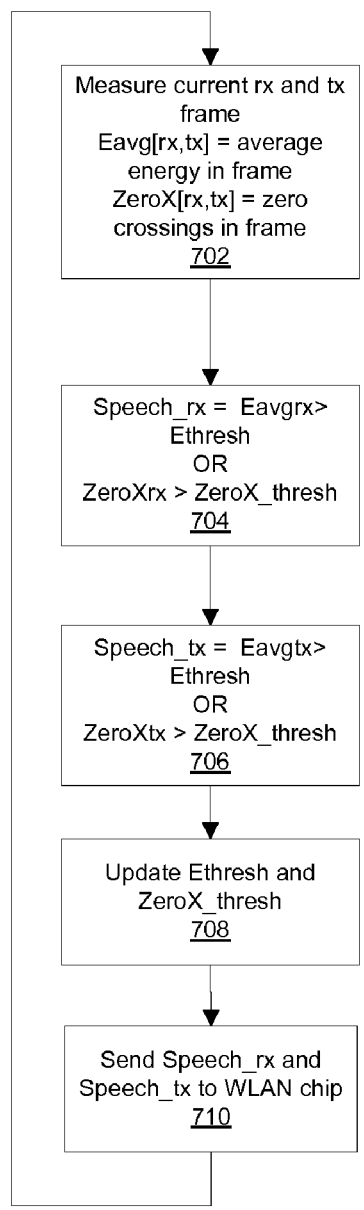

As shown in FIG. 7, in 702, current receive (rx) and transmit (tx) frames may be measured. The average energy in each frame as well as the number of zero crossing in each frame may be determined.

In 704, the variable Speech_rx may be true if the average receive energy exceeds a reception energy threshold or if the number of zero crossings for the receive frame exceeds a zero crossing threshold.

Similarly, in 706, the variable Speech_tx may be true if the average transmit energy exceeds a transmit energy threshold or if the number of zero crossings for the transmit frame exceeds a zero crossing threshold.

In 708, the thresholds may be updated. Long-term average statistics may also be collected, e.g., in addition to the within frame averages. If the frame is a speech frame, the average power and average zero-crossing statistics may be updated to include the effect of the current speech frame.

$$\mu_{Est,n+1} = \mu_{Est,n} + \alpha_{Est}(Est - \mu_{Est,n}),$$

where $0 < \alpha_{Est} < 1$ is a small positive constant, Est is the average power within the frame, $\mu_{Est,n}$ is the old long term average power, $\mu_{Est,n+1}$ is the updated long term average power.

The zero crossing statistics may be updated similarly:

$$\mu_{zc,n+1} = \mu_{zc,n} + \alpha_{zc}(zc - \mu_{zc,n}),$$

where $0 < \alpha_{zc} < 1$ is a small positive constant, zc is the average zero-crossings within the frame, $\mu_{zc,n}$ is the old long term average zero-crossings, and $\mu_{zc,n+1}$ is the updated long term average zero-crossings.

For simplicity, the thresholds may be set to be a fraction of these long-term averages.

$$EThresh = r_{Est} \mu_{Est,n+1}$$

$$ZeroX\_thresh = r_{zc} \mu_{zc,n+1}$$

where $0 < r_{Est} < 1$ and $0 < r_{zc} < 1$ are small positive constants.

In 710, the variables Speech_rx and Speech_tx may be transmitted to the WLAN chip (e.g., the first transmission protocol logic).

Voice Activity Detection

The following section provides information regarding voice activity detection (VAD) which may be used by various systems and methods described above. Note that these descriptions are not intended to limit the scope of the descriptions provided above, and in particular any of various VAD algorithms are envisioned.

VAD algorithms determine whether a frame contains human speech or not. In cases where the VAD algorithm is a front-end of another system, such as speech recognition, the complexity can be high. In these cases, VAD significantly relieves the computational load by discarding the frames that do not contain human speech. In such cases, VAD accuracy may be very important. Incorrect classification of speech frames can lead to bad results. Therefore, design of such a VAD algorithm is extremely difficult when cases of loud non-stationary background noise have to be considered. It is even more difficult when the background noise is a group of other speakers.

VAD algorithms have two main processing blocks. Initially, feature extraction is performed on the speech signal. These features include short time energy, zero-crossing rate, linear prediction coefficients (LPC) or line spectral frequencies (LSF), low frequency energy, high frequency energy, eigen-analysis based features, features extracted from sub-space based approaches, cepstral analysis features, higher-order statistics, etc. Once these features are extracted, classification is performed. The simplest classification is just a comparison to thresholds. More complex scenarios might involve dynamically adjusted thresholds, neural network based non-linear segmentation of the feature space, fuzzy logic based dynamic clustering, hidden Markov model based approach to smooth out the state transitions, etc.

The nature of the extracted feature parameters dictates what kind of classification approach should be used. Some features, such as energy levels, have a meaning when the power level of the speech component and the power level of the noise component are known. Therefore, the classification algorithm may perform dynamically changing thresholding to account for quiet speakers and non-stationary noises. Some other features such as zero-crossing rate and LPCs are relatively invariant of the speaker, but may be affected by non-stationary noise.

Usually, VAD algorithms typically operate only on the parameter space of the speech codec in order to avoid unnecessary computational complexity. If the codec is very simple, it has a high data-rate and it can probably tolerate dropped packets due to misclassified speech frames. However, if the codec is sophisticated, the entire set of extracted features should be used. In the Bluetooth protocol, for example, with the a/mu-law codec, energy estimate and zero-crossing rate are the only natural candidates for features. Anything more complicated would require significant computational power.

However, the codecs on the VoIP side are very sophisticated. The VAD algorithm may operate on a speech signal that is passed through these codecs. Any distortion introduced as a result of VAD misclassification might affect the speech quality significantly. Echo cancellation algorithms tend to be very sensitive to external (unmodeled) distortions. VAD misclassification errors are usually divided into these groups: a part of the beginning of a speech segment is classified as noise, a part of the end of a speech segment is classified as noise, a part of the middle of a speech segment is classified as noise, and a part of a noise segment is classified as speech.

If a noise frame is misclassified as speech, it will be transmitted. Without the VAD it will be transmitted anyway. Therefore false alarms of such kind do not affect speech quality. Speech quality is affected when almost all of the frames are classified as noise, because in these cases, BT and WLAN start to interfere, and many speech packets become corrupted. Many errors of this kind are required for speech distortion to become audible. When a speech packet is misclassified as noise and dropped because of this, speech distortion is inevitable. A single VAD mistake may cause a clicking sound.

Sometimes a packet will be lost because of unavoidable WLAN-BT collision. If nothing is done and packets are let collide and lost, audio can be severely distorted. Alternatively, one can use an accurate algorithm that detects which packets do not contain speech and marks them to be dropped without significant audio quality degradation. Accordingly, the algorithm may simply decide not to transmit these noise (or silent speaker) packets, if it receives information that packet collision will occur with high probability.

A simple algorithm based on HMM (hidden Markov model) may be used that operates on very simple features, such as short time energy, and zero crossings. Unlike conventional algorithms, the observation layer may include the extracted features for both speakers. The hidden layer may only include 4 states: 'speaker 1 speaks, speaker 2 silent', 'speaker 2 speaks, speaker 1 silent', 'both speak', 'both are silent'. This HMM produces soft outputs that are a probabilistic measure of what the real state is. This output in conjunction with hardware signals such as 'BT priority' and 'WLAN active' can be a very good prediction of imminent front-end saturation and a reliable recommendation of which transmission should be delayed or dropped.

In Bluetooth, SCO packets can be either 30 samples, 20 samples or 10 samples long. eSCO frames may have even more samples, e.g., exceeding 30 bytes. The algorithm may extract local speech features for each packet.

Short time energy of each packet can be calculated as in equation (1):

$$E_{st} = \sum_{n=0}^{29} |s[n]|^2, \qquad (1)$$

where s[n] are 8-bit signed numbers representing each speech sample. The number of zero-crossings may be easily computed as it involves the number of sign changes in a packet. This may need to be normalized for packets of different sizes. The zero-crossings algorithm is described accordingly below:

N=30, % frame-size
ze=0;
for n=1; N-1
  -zc+=sgn(s[n])⊕sgn(s[n-1])
zc=zc/N % normalize The standard G.711 provides logarithmic encoding of the speech signal to compress its dynamic range. Since the signal is already in logarithmic format, raising to a constant power is equivalent to multiplication by a constant. Applying distributivity, this constant can be absorbed at the threshold parameter applied later. However, addition of log-scalars is not easy. For example:

Let lx=log(x) and ly=log(y).

$$\log(x+y)=\log(\exp(lx)+\exp(ly))=\max(lx,ly)+\log(1+e^{-|lx-ly|}) \qquad (2)$$

If lx>>ly or vice-versa simply taking the maximum of the two numbers would be sufficient. However, the purpose of this log representation is to reduce the dynamic range of the signal, and two consecutive log-samples generally have similar magnitude. This operation can be implemented with a simple look-up table:

| lx − ly | log(1 + exp(−|lx − ly|)) |
|---|---|
| 0 | 0.69314718055995 |
| 1 | 0.31326168751822 |
| 2 | 0.12692801104297 |
| 3 | 0.04858735157374 |

| 1x − 1y | log(1 + exp(−|1x − 1y|)) |
|---|---|
| 4 | 0.01814992791781 |
| 5 | 0.00671534848912 |
| 6 | 0.00247568513773 |
| 7 | 0.00091146645377 |

The table size need not be very large. For example, four rows should be sufficient. The algorithm of computing an estimate of a short-time energy is summarized below. Note that the zero-crossings can be computed in exactly the same manner as with the linear PCM samples. Log-law algorithms do not alter the signs.

Figure 8:
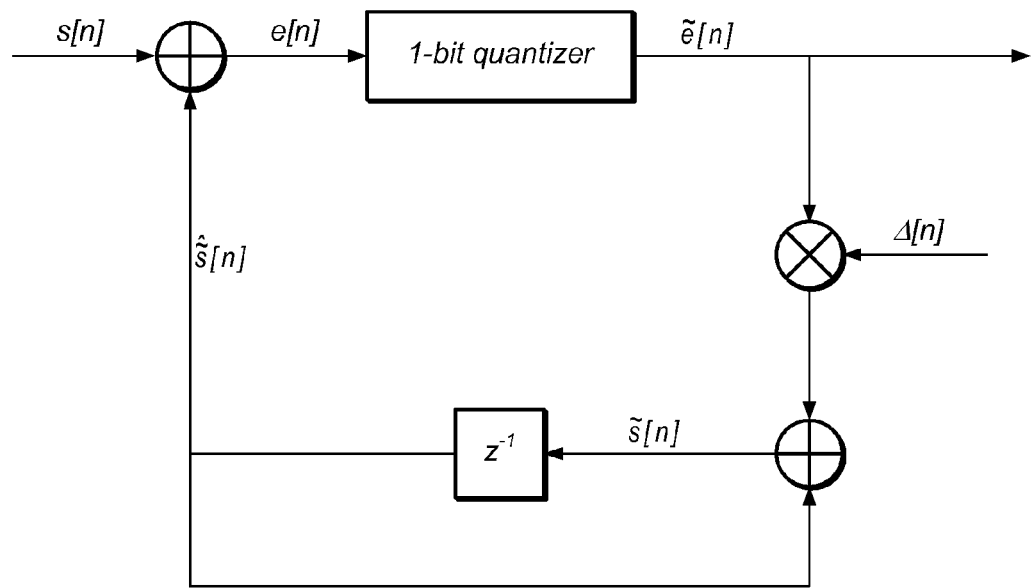
FIGS. 8 and 9 are exemplary encoders and decoders related to voice activity detection, according to one embodiment.
Figure 9:
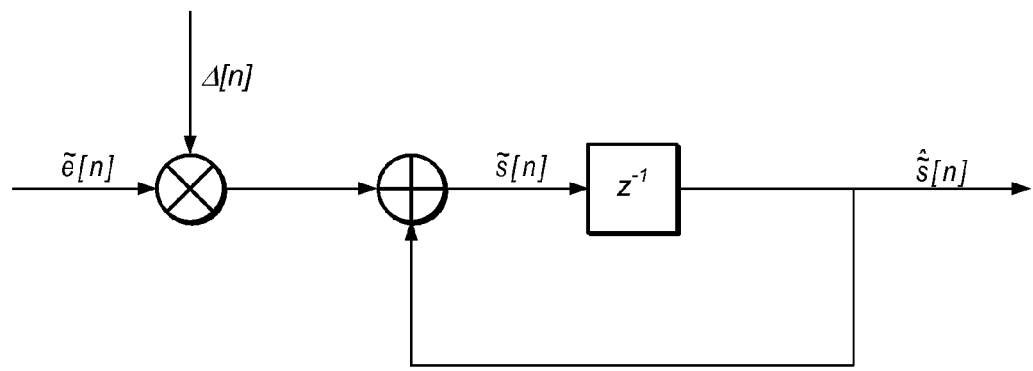

$C=2^5$, % costant
$N=30$; % frame-size
$E_{gt}=C|s_{log}[0]|$;
for n=1; N−1
   $-E_{gt}=\max(E_{gt},C_{|sLog}[n]|)+\log(1+e^{-|E_{-}-|E_{gt}^{C|g_{log}[n]|}|})$
$E_{gt}=E_{gt}/(CN)$% normalize To calculate a short time energy estimate, a CVSDM decoder in FIG. 8 can be implemented. The decoder of FIG. 8 includes a running sum and a scaler Δn which keeps track of the number of consecutive identical received bits. A simpler but coarser solution would be to only reconstruct the scaling factor and obtain an energy estimate by running a decimated low pass filter on it. In order to obtain zero-crossing, the CVSDM decoder of FIG. 9 may be used.

As indicated above, this VAD is intended to be used in conjunction with a BT-WLAN coexistence protocol. A media access algorithm may be implemented to allow the two radios to coexist. The radio's channel may be orthogonalized in time, i.e. radio activity can be time multiplexed or shared.

Due to the synchronous nature of BT protocols and the delay sensitivity of real-time audio, a packet transmission may not be arbitrarily delayed. Moreover, some BT audio profiles do not even allow packet retransmission. Without an arbitration mechanism, there will be collisions and some packets will be lost. Having lost packets in BT links directly affects the audio quality. In such cases, the users experience severe degradation in the articulation and intelligibility of the received audio.

Luckily, human speech is well partitioned into words and sentences with silent intervals in between. In addition, there are some additional silent intervals when a conversation transitions from one speaker to the other. The human psycho-acoustical system naturally has masking effects.

Every lost audio frame causes audio quality degradation. Discarding speech-containing packets degrades the audio quality more than discarding silence packets. An algorithm that detects silence periods and the transitions between speech and silence can help improve audio quality. A radio MAC protocol can decide intelligently which packet may be safely discarded. This VAD algorithm detects audio presence based on short-time energy, and number of zero-crossings in an audio frame.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for performing wireless communication using first and second wireless communication protocols, wherein the first and second wireless communication protocols operate in a common communication medium, the method comprising:
performing wireless communication using the first wireless communication protocol and the second wireless communication protocol using the common communication medium, wherein said performing the communication is time shared, wherein frames are transmitted using the first wireless communication protocol and the second wireless communication protocol during respective time slots;
measuring properties of voice traffic on current frames of the second wireless communication protocol, wherein said measuring comprises determining a magnitude of an audio signal in the current frames and a number of zero crossings in each frame;
predicting whether one or more subsequent frames of the second wireless communication protocol will have voice traffic;
if said predicting predicts that the one or more subsequent frames of the second wireless communication protocol will have voice traffic, transmitting data using the second wireless communication protocol during a subsequent second wireless communication protocol time slot;
if said predicting predicts that the one or more subsequent frames of the second wireless communication protocol will not have voice traffic, transmitting data using the first wireless communication protocol on the common communication medium during the subsequent second wireless communication protocol time slot.

2. The method of claim 1, further comprising:
generating a second wireless communication protocol priority signal to indicate that transmission using the second wireless communication protocol is being performed on the common communication medium;
wherein said transmitting using the first wireless communication protocol on the common communication medium during the subsequent second wireless communication protocol time slot is performed despite generation of the second wireless communication protocol priority signal.

3. The method of claim 1,
wherein the first wireless communication protocol is a wireless local area network protocol; and
wherein the second wireless communication protocol is a short range wireless communication protocol.

4. The method of claim 3, wherein said performing wireless communication comprises performing wireless communication using the second communication protocol with a headset device.

5. A system for performing wireless communication, the system comprising:
first logic for performing wireless communication using a first wireless communication protocol, wherein the first logic is configured to transmit and receive frames according to the first wireless communication protocol on a common communication medium;
second logic for performing wireless communication using a second wireless communication protocol, wherein the second logic is configured to transmit and receive frames according to the second wireless communication protocol on the common communication medium;
wherein the first logic and the second logic are configured to time share the common communication medium, wherein the first logic and the second logic transmit frames during respective time slots;

prediction circuitry coupled to the first logic and the second logic for predicting whether one or more subsequent frames of the second wireless communication protocol will have voice traffic, wherein the prediction circuitry is configured to determine a magnitude of an audio signal in current frames and a number of zero crossings in each frame to perform said predicting, and wherein the prediction circuitry is configured to provide prediction information to the first logic;

wherein the second logic is configured to transmit on the common communication during a subsequent second wireless communication protocol time slot if the prediction information indicates that one or more subsequent frames of the second wireless communication protocol will have voice traffic;

wherein the first logic is configured to transmit on the common communication medium during the subsequent second wireless communication protocol time slot if the prediction information indicates that the one or more subsequent frames of the second wireless communication protocol will not have voice traffic.

6. The system of claim 5,
wherein the prediction circuitry is configured to measure properties of voice traffic on current frames of the second wireless communication protocol for predicting whether the one or more subsequent frames will have voice traffic.

7. The system of claim 5,
wherein the second logic is further configured to generate a second wireless communication protocol priority signal to indicate that the second wireless communication protocol is being used for transmission on the common communication medium;
wherein the first logic is further configured to transmit on the common communication medium during the subsequent second wireless communication protocol time slot despite generation of the second wireless communication protocol priority signal when the second wireless communication protocol will not have voice traffic.

8. The system of claim 5,
wherein the second logic comprises the prediction logic.

9. The system of claim 5,
wherein the first wireless communication protocol is a wireless local area network protocol; and
wherein the second wireless communication protocol is a short range wireless communication protocol.

10. A system for performing wireless communication, the system comprising:
first logic for performing wireless communication using a first wireless communication protocol, wherein the first logic transmits frames according to the first wireless communication protocol on a common communication medium;
one or more ports for communicating with second logic, wherein the second logic is configured to perform wireless communication using a second wireless communication protocol, wherein the second logic is configured to transmit frames according to the second wireless communication protocol on the common communication medium;
wherein the first logic is configured to time share the common communication medium, wherein the first logic is configured to transmit frames during respective time slots;

prediction circuitry coupled to the first logic for predicting whether one or more subsequent frames of the first wireless communication protocol will have voice traffic, wherein the prediction circuitry is configured to determine a magnitude of an audio signal in current frames and a number of zero crossings in each frame to perform said predicting, and wherein the prediction circuitry is configured to provide prediction information to the second logic using the one or more ports;

wherein the prediction information is usable by the second logic to determine to transmit during a subsequent first wireless communication protocol time slot if the prediction information indicates that one or more subsequent frames of the first wireless communication protocol will not have voice traffic;

wherein the first logic is configured to transmit on the common communication medium during the subsequent second wireless communication protocol time slot if the prediction information indicates that the one or more subsequent frames of the first wireless communication protocol will have voice traffic.

11. The system of claim 10,
wherein the prediction circuitry is configured to measure properties of voice traffic on current frames of the first wireless communication protocol for predicting whether the one or more subsequent frames will have voice traffic.

12. The system of claim 10,
wherein the first logic is further configured to generate a first wireless communication protocol priority signal to indicate that the first wireless communication protocol is transmitting on the common communication medium.

13. The system of claim 10,
wherein the first wireless communication protocol is a short range wireless communication protocol.

14. A system for performing wireless communication, the system comprising:
first logic for performing wireless communication using a first wireless communication protocol, wherein the first logic transmits frames according to the first wireless communication protocol on a common communication medium;
one or more ports for communicating with second logic, wherein the second logic is configured to perform wireless communication using a second wireless communication protocol, wherein the second logic is configured to transmit frames according to the second wireless communication protocol on the common communication medium;
wherein the first logic is configured to time share the common communication medium, wherein the first logic is configured to transmit frames during respective time slots;
wherein the first logic is configured to receive prediction information indicating whether one or more subsequent frames of the second wireless communication protocol will have voice traffic via the one or more ports, wherein the prediction information is based on a magnitude of an audio signal in current frames and a number of zero crossings in each frame;
wherein the first logic is configured to transmit during a subsequent second wireless communication protocol time slot if the prediction information indicates that one or more subsequent frames of the second wireless communication protocol will not have voice traffic;
wherein the first logic is configured to not transmit on the common communication medium during the subsequent second wireless communication protocol time slot if the prediction information indicates that the one or more subsequent frames of the second wireless communication protocol will have voice traffic.

15. The system of claim 14, wherein the prediction information is based on voice traffic on current frames of the second wireless communication protocol.

16. The system of claim 14,
wherein the first logic is further configured to receive a second wireless communication protocol priority signal which indicates that the second wireless communication protocol is transmitting on the common communication medium;
wherein the first logic is further configured to transmit on the common communication medium during the subsequent second wireless communication protocol time slot despite generation of the second wireless communication protocol priority signal when the second wireless communication protocol will not have voice traffic.

17. The system of claim 14, wherein the first wireless communication protocol is a wireless local area network protocol.

18. A method for predicting whether voice traffic will be present in subsequent frames of a first wireless communication protocol, comprising:
receiving a current receive frame;
determining an average energy of the receive frame;
comparing the average energy of the receive frame to a first energy threshold;
determining a number of zero crossing of the receive frame;
comparing the number of zero crossings of the receive frame to a first zero crossing threshold;
predicting if there will be voice traffic in a subsequent receive frame based on said comparing the average energy of the receive frame and said comparing the number of zero crossings of the receive frame;
receiving a current transmit frame;
determining an average energy of the transmit frame;
comparing the average energy of the transmit frame to a second energy threshold;
determining a number of zero crossing of the transmit frame;
comparing the number of zero crossings of the transmit frame to a second zero crossing threshold;
predicting if there will be voice traffic in a subsequent transmit frame based on said comparing the average energy of the transmit frame and said comparing the number of zero crossings of the transmit frame;
storing prediction information based on said predicting if there will be voice traffic in a subsequent receive frame and said predicting if there will be voice traffic in a subsequent transmit frame.

19. The method of claim 18, further comprising:
transmitting the prediction information, wherein the prediction information is usable in determining whether a second wireless communication protocol should transmit over a time slot reserved for the first wireless communication protocol in a common communication medium.

* * * * *